US011587097B2

(12) United States Patent
Stob

(10) Patent No.: US 11,587,097 B2
(45) Date of Patent: Feb. 21, 2023

(54) ORGANIZATION LOCATION VERIFICATION

(71) Applicant: James A. Stob, St Charles, IL (US)

(72) Inventor: James A. Stob, St Charles, IL (US)

( * ) Notice: Subject to any disclaimer, the term of this patent is extended or adjusted under 35 U.S.C. 154(b) by 268 days.

(21) Appl. No.: 16/104,525

(22) Filed: Aug. 17, 2018

(65) Prior Publication Data

US 2019/0057395 A1 Feb. 21, 2019

Related U.S. Application Data

(60) Provisional application No. 62/636,953, filed on Mar. 1, 2018, provisional application No. 62/546,763, filed on Aug. 17, 2017.

(51) Int. Cl.
*G06Q 30/00* (2012.01)
*G06F 16/51* (2019.01)
*G06F 16/958* (2019.01)
*G06Q 30/018* (2023.01)

(52) U.S. Cl.
CPC ......... *G06Q 30/018* (2013.01); *G06F 16/51* (2019.01); *G06F 16/958* (2019.01)

(58) Field of Classification Search
None
See application file for complete search history.

(56) References Cited

U.S. PATENT DOCUMENTS

| 8,798,378 | B1 * | 8/2014 | Babenko | G06V 20/20 |
| | | | | 382/224 |
| 9,076,040 | B1 * | 7/2015 | Jing | G06V 20/13 |
| 9,300,678 | B1 * | 3/2016 | Stack | H04W 12/104 |
| 9,495,614 | B1 * | 11/2016 | Boman | G06F 16/29 |
| 9,953,369 | B2 * | 4/2018 | Collins | G06F 16/22 |
| 10,573,020 | B1 * | 2/2020 | Sokolov | G06F 16/51 |

(Continued)

FOREIGN PATENT DOCUMENTS

CN 107038589 B * 2/2019 ......... G06Q 30/0185

OTHER PUBLICATIONS

A. Gallagher, D. Joshi, J. Yu and J. Luo, "Geo-location inference from image content and user tags," 2009, 2009 IEEE Computer Society Conference on Computer Vision and Pattern Recognition Workshops, pp. 55-62 (Year: 2009).*

(Continued)

*Primary Examiner* — Sarah M Monfeldt
*Assistant Examiner* — Michael J. Monaghan
(74) *Attorney, Agent, or Firm* — Belles Katz LLC

(57) ABSTRACT

In one embodiment, the present disclosure is directed to a method of verifying a location of an organization. The method includes providing a user interface to a device of a representative of an organization, the user interface prompting the representative to provide organization data. The organization data includes organization name data indicative of an organization name, organization address data indicative of a location of the organization, photograph files for photographs of specific different portions of the location of the organization, and photograph location data indicative of where each of the photographs was taken. The method further includes receiving the organization data from the device, and verifying that the organization address data corresponds with the organization address data.

14 Claims, 12 Drawing Sheets

(56) References Cited

U.S. PATENT DOCUMENTS

| | | | |
|---|---|---|---|
| 2003/0023541 A1 | 1/2003 | Black et al. | |
| 2004/0101212 A1* | 5/2004 | Fedorovskaya | G06T 7/00 |
| | | | 707/E17.026 |
| 2005/0021551 A1 | 1/2005 | Silva et al. | |
| 2007/0174208 A1 | 7/2007 | Black et al. | |
| 2008/0320036 A1* | 12/2008 | Winter | G06F 16/58 |
| 2009/0073191 A1* | 3/2009 | Smith | G06Q 30/02 |
| | | | 345/629 |
| 2009/0189811 A1* | 7/2009 | Tysowski | G01S 19/42 |
| | | | 342/357.34 |
| 2009/0222482 A1* | 9/2009 | Klassen | G06F 16/29 |
| 2011/0035284 A1* | 2/2011 | Moshfeghi | G06Q 30/02 |
| | | | 705/14.58 |
| 2011/0055911 A1 | 3/2011 | Adelman | |
| 2012/0308077 A1* | 12/2012 | Tseng | G06F 16/532 |
| | | | 382/103 |
| 2012/0310968 A1* | 12/2012 | Tseng | G06F 16/5866 |
| | | | 707/769 |
| 2013/0095855 A1* | 4/2013 | Bort | G06T 17/05 |
| | | | 455/456.2 |
| 2013/0265450 A1* | 10/2013 | Barnes, Jr. | H04N 5/772 |
| | | | 348/207.1 |
| 2014/0115055 A1* | 4/2014 | Jackson | G06F 16/487 |
| | | | 709/204 |
| 2015/0094083 A1* | 4/2015 | Ngo | H04W 4/029 |
| | | | 455/456.1 |
| 2015/0100578 A1* | 4/2015 | Rosen | G06F 16/23 |
| | | | 707/737 |
| 2015/0170368 A1* | 6/2015 | Janky | G06T 7/74 |
| | | | 382/103 |
| 2015/0310556 A1* | 10/2015 | Kiper | G06Q 30/0283 |
| | | | 705/4 |
| 2017/0140490 A1* | 5/2017 | Leonard | H04N 1/00119 |
| 2017/0228802 A1* | 8/2017 | Maynard | H04W 4/021 |
| 2018/0374075 A1* | 12/2018 | Tian | G06K 9/00892 |

OTHER PUBLICATIONS

T. Kliment et al., "Image data and metadata workflows automation in geospatial data infrastructure deployed for agricultural sector," 2015, 2015 IEEE International Geoscience and Remote Sensing Symposium (IGARSS), pp. 146-149, (Year: 2015).*

* cited by examiner

40

45

46

< Menu                 Edit

Place Name
Computer Repair

Address1
123 Western Ave

Address2
Suite 350

City           State   Postal Code
Chicago    IL    60134

Country Code
US

Primary Phone
123-456-7890

Web Address
http://www.computerrepair123.com

Is this location inside a mall or store?
◯

Name of mall or store your business is located in

FIG. 7

ORGANIZATION LOCATION VERIFICATION

CROSS REFERENCE TO RELATED APPLICATIONS

The present application claims the benefit of U.S. Provisional Patent Application No. 62/546,763 filed on Aug. 17, 2017, and U.S. Provisional Patent Application No. 62/636,953 filed Mar. 1, 2018, which are incorporated herein by reference in their entireties.

BACKGROUND

Internet search engines strive to provide users reliable information regarding businesses and other organizations, including reliable address information. To do so, search engines will often use web crawlers and data aggregators to determine organization information. But the results of such efforts are often unreliable, especially for small business that are more difficult to track. For example, if a restaurant leaves a location and is replaced by a new restaurant, current methods struggle to determine which restaurant name corresponds with the location. Further, some users will trick search engines into believing that a business exists at an address where it does not. For example, someone could create the impression that a locksmith runs a business out of a certain address, when in reality the person created the locksmith identity using a home address so that, when the person is contacted for locksmith services, the person can sell the lead to an actual locksmith. Such activity clogs the internet and search engines with unreliable information that wastes network resources and slows computer performance. What is needed is a more reliable and efficient manner of verifying organization locations.

BRIEF SUMMARY

The verification method described herein solves a technical problem that prior technical solutions have failed to solve. The verification method utilizes photographs and their corresponding location data to verify that a provided organization address is accurate. Users registering an organization address are required to provide photographs of different portions of the organization building. Location data indicating where the photographs were taken can then be used to verify the organization address provided. Improved geolocations may also be determined. The method disclosed herein enables search engines to receive and provide much more reliable organization information. Further, by eliminating unreliable information, this verification method enables more efficient use of network resources and faster computer and internet performance.

The present disclosure may be directed, in one aspect, to a method of verifying a location of an organization, the method including providing, by a server, a user interface to a device of a representative of an organization, the user interface prompting the representative to provide organization data, the organization data comprising: organization name data indicative of an organization name; organization address data indicative of a location of the organization; photograph files for photographs of specific different portions of the location of the organization; and photograph location data indicative of where each of the photographs was taken; receiving, at the server, the organization data from the device; and verifying, by the server, that the organization address data corresponds with the photograph location data.

In another aspect, a system includes a device of a representative of an organization, the device having a camera for taking photographs; a server configured to provide a user interface to the device, the user interface prompting the representative to provide organization data, the organization data comprising: organization name data indicative of an organization name; organization address data indicative of a location of the organization; photograph files for photographs of specific different portions of the location of the organization; and photograph location data indicative of where each of the photographs was taken; wherein the server is further configured to receive the organization data from the device, and verify that the organization address data corresponds with the photograph location data.

In yet another aspect, a non-transitory computer-readable storage medium encoded with instructions, when executed on a processor, performs a method of: providing, by a server, a user interface to a device of a representative of an organization, the user interface prompting the representative to provide organization data, the organization data comprising: organization name data indicative of an organization name; organization address data indicative of a location of the organization; photograph files for photographs of specific different portions of the location of the organization; and photograph location data indicative of where each of the photographs was taken; receiving, at the server, the organization data from the device; and verifying, by the server, that the organization address data corresponds with the photograph location data.

BRIEF DESCRIPTION OF THE DRAWINGS

The present disclosure will become more fully understood from the detailed description and the accompanying drawings, wherein:

FIG. 7 is a screenshot of the user interface where organization name, address, and similar information can be provided for the selected organization location.

DETAILED DESCRIPTION

Figure 1:
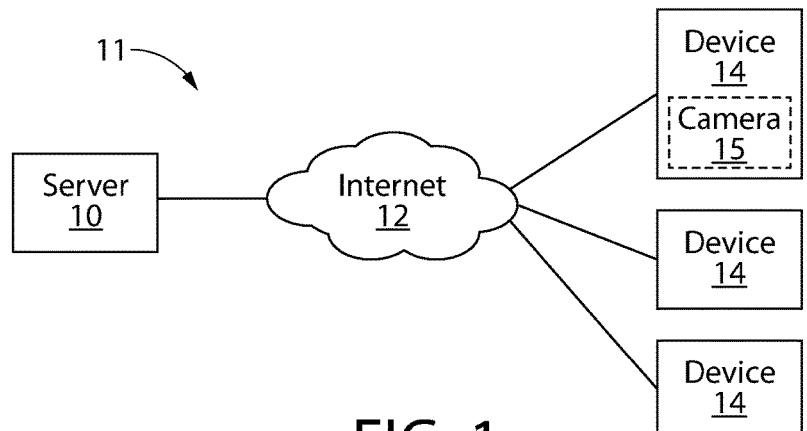
FIG. 1 is a block diagram of a system for verifying a location of an organization according to one embodiment.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

System

Referring now to FIG. 1, a block diagram of a system 11 according to one embodiment of the invention is shown. The exemplified system 11 includes a server 10 and devices 14 that each are connected (directly or indirectly) to the internet 12. The devices 14 belong to representatives of organizations. An organization can be any type of organization, including a for-profit business, a government entity, or a non-profit organization. The representative can be any type of paid or unpaid representative of an organization, including an employee, a manager, or a person outside the organization (such as a contractor) that has some level of authority to represent the organization.

The server 10 can be any computer or processor (or collection thereof) for carrying out programs in accordance with the functions described herein. In the exemplified embodiment, the server 10 communicates with representative devices 14 through an internet connection. In the exemplified embodiment, the devices 14 are mobile smartphones having a camera 15. The devices 14 connect to the internet through use of a telecommunication network (e.g., 3G or 4G) or a network router. In other embodiments, the server 10 can communicate with the devices 14 through any standard communication means, including through one or more wired internet connections, or through direct communications without use of the internet. Further, in other embodiments, the devices 14 can be any computer devices capable of carrying out programs in accordance with the functions described herein (including laptop computers, desktop computers, and tablets). It is noted that common components such as memory devices and power sources are not discussed herein, as their role would be easily understood by those of ordinary skill in the art.

Figure 2:
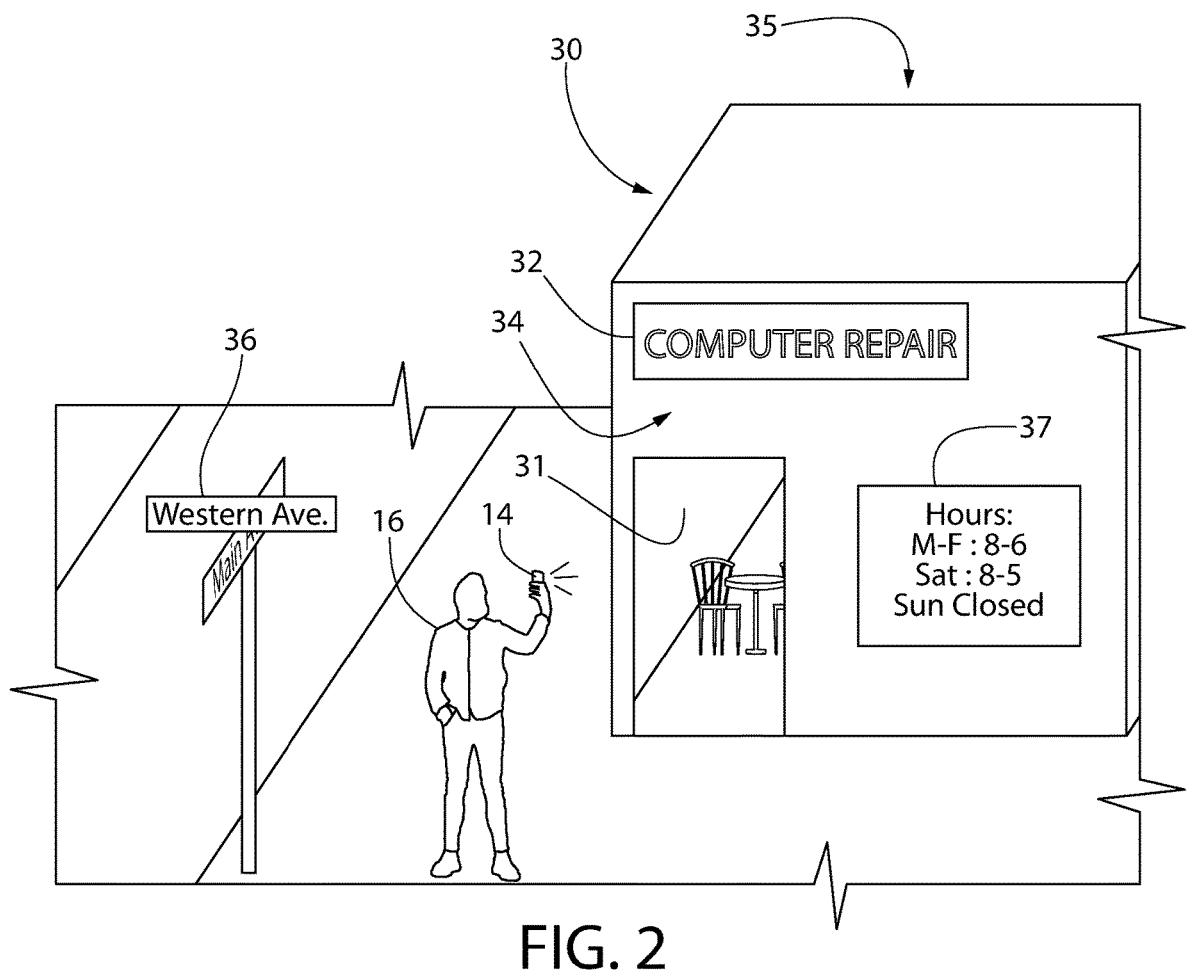
FIG. 2 is an image of a representative verifying a location of an organization according to one embodiment.

FIG. 2 is an image of a representative 16 verifying a location of an organization building 30 according to one embodiment. The representative 16 has a device 14 that can take photographs of different portions of the location of the organization, such as various locations associated with the organization building 30. For example, the device 14 can take photographs of an organization storefront 34, an organization sign 32, an inside portion 31 of the organization building 30, an indicator (e.g., sign) of organization hours 37, a rear 35 of the organization building, and the closest cross street sign 36 for the organization building. As will be described below, these different photographs, along with data associated with the photographs, can be used to verify an organization location.

Figure 3:
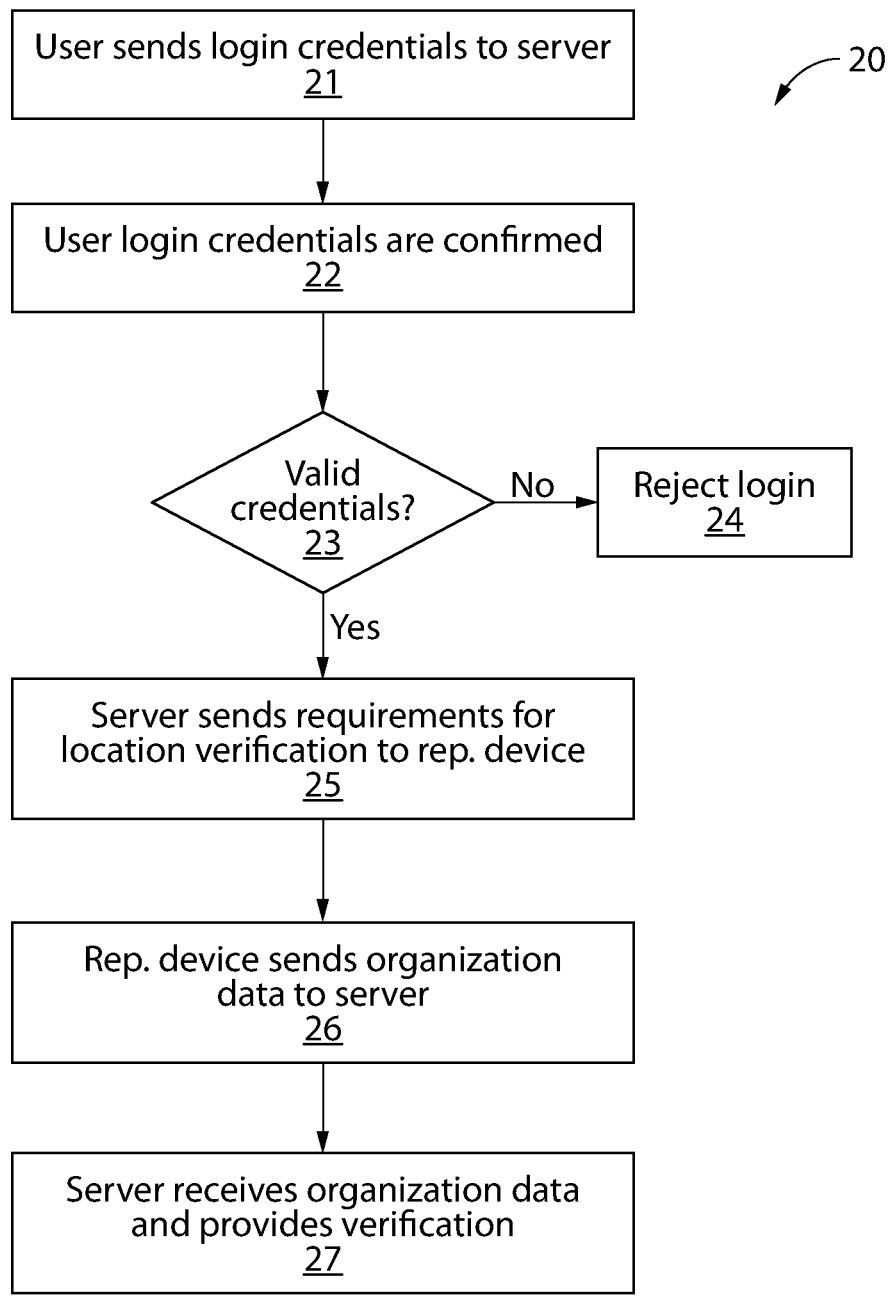
FIG. 3 is a flow chart of a method for verifying a location of an organization according to one embodiment.
Figure 4:
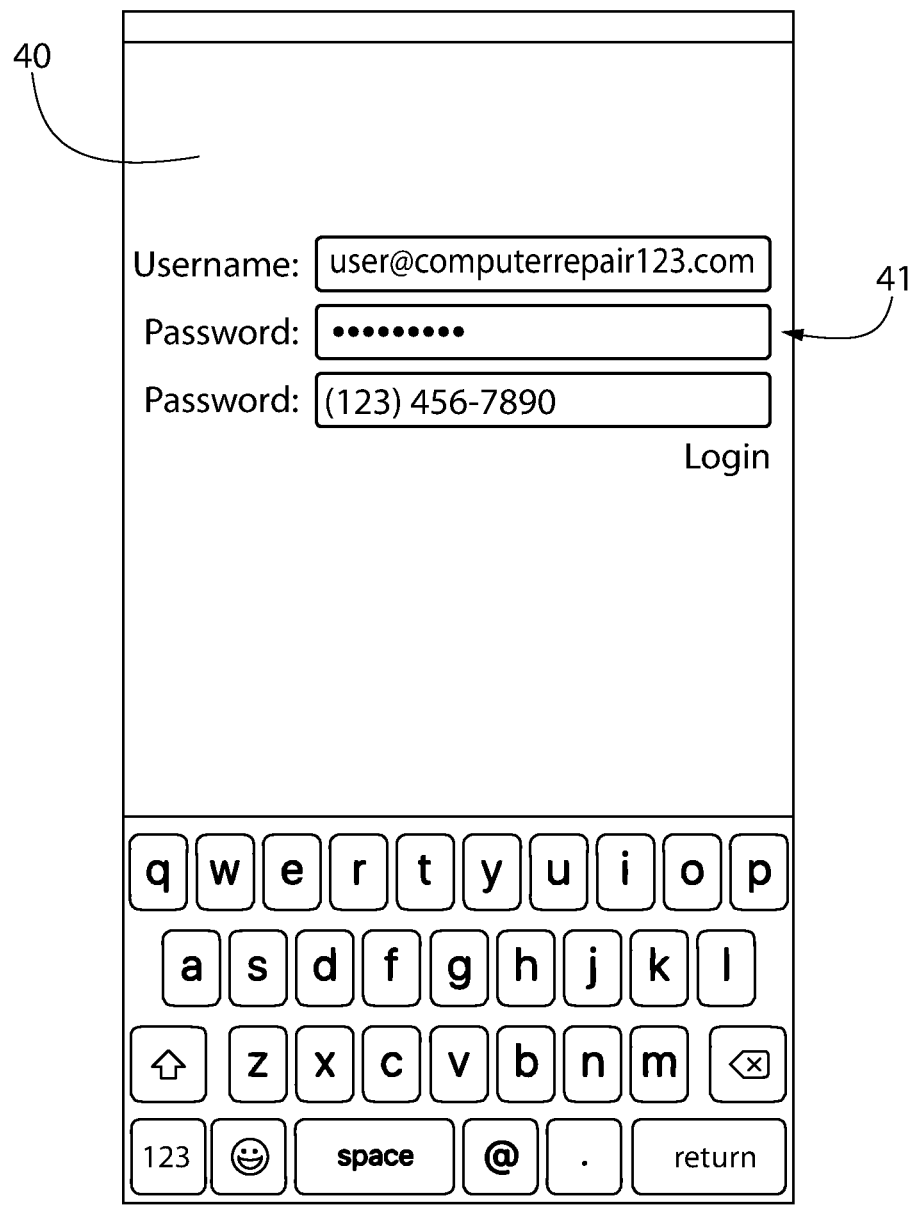
FIG. 4 is a screenshot of a user interface by which a representative enters user credentials to access an application for verifying an organization location according to one embodiment.

FIG. 3 is a flow chart of a method 20 for verifying a location of an organization according to one embodiment. In describing the exemplified method of FIG. 3, reference will also be made to the screenshots of FIGS. 4-11. In a first operation (operation 21), a user sends login credentials to the server. In the exemplified embodiment, such login credentials are sent using a smartphone application or "app." A first instance of the app is shown in FIG. 4. The app provides a user interface 40 on the representative device. The user interface 40 enables a representative to enter user credentials 41 to access the app for verifying an organization location. In other embodiments, the verification application can be any program for carrying out the functions described herein, including programs running on a laptop or desktop computer. In the exemplified embodiment, the user interface 40 utilizes a touch screen provided by the smartphone. In other embodiments, the user interface can be any interface capable of enabling a user to carry out the functions described herein, including an interface utilizing a computer monitor, mouse, and/or keyboard.

Returning to FIG. 3, the server receives the login credentials and they are confirmed (operation 22). It is determined whether the user credentials are valid (operation 23). If they are not, the login is rejected (operation 24). If the user credentials are valid, the server sends to the device the requirements for verifying a location (operation 25). The representative device then sends the required organization data to the server (operation 26). The process of requesting and receiving organization data (including required organization data for verification) shall be described below with reference to FIGS. 5-11. As used herein, "organization data" can refer to any data related to an attribute of the organization.

Obtaining Organization Data

Figure 5:
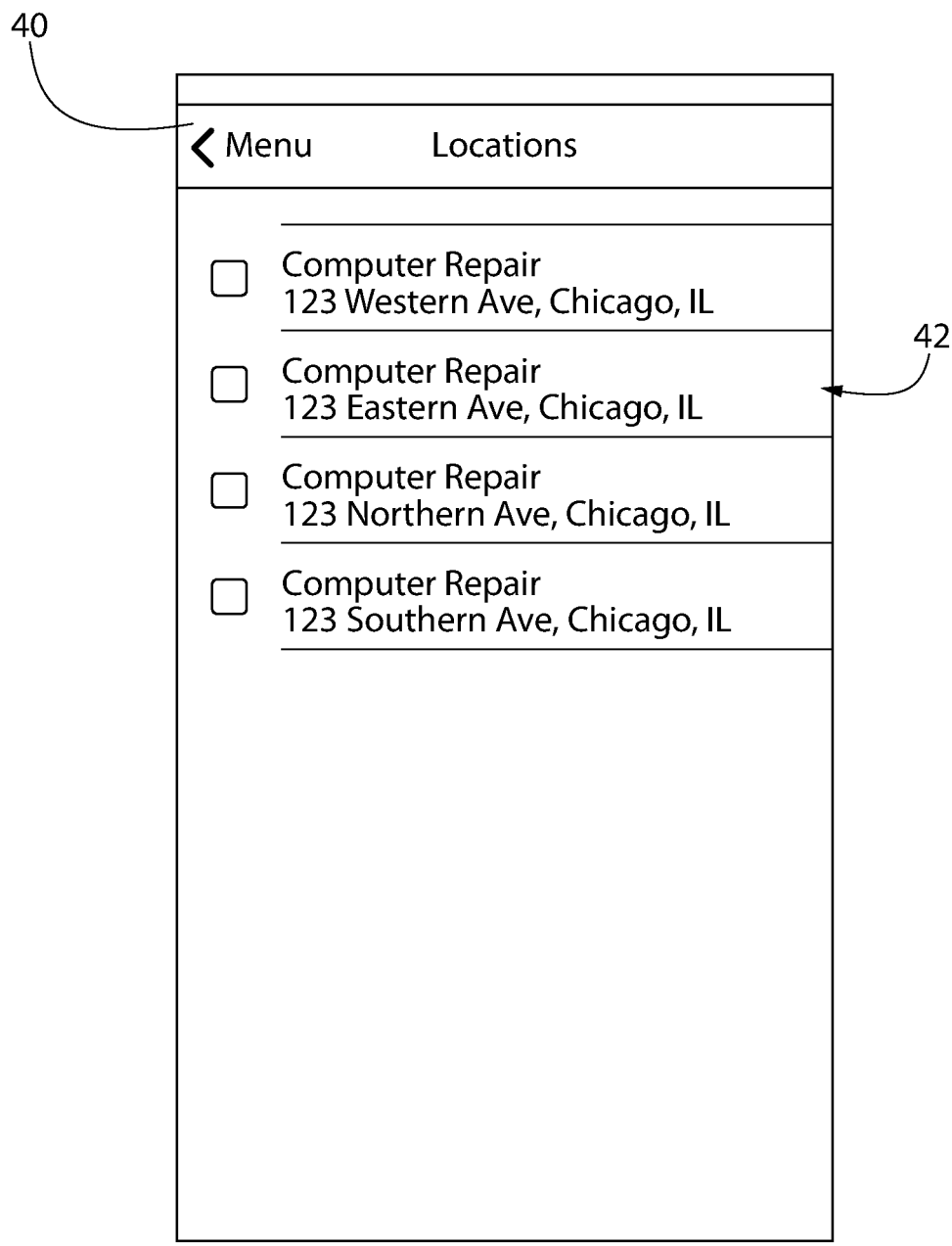
FIG. 5 is a screenshot of the user interface showing different organization locations managed by the representative.

FIG. 5 is a screenshot of the user interface 40 after the login process showing different organization locations 42 managed by the representative. These are organization locations for which the representative has authority to provide or alter data. In this embodiment, the representative is managing four locations for the company Computer Repair.

Figure 6:
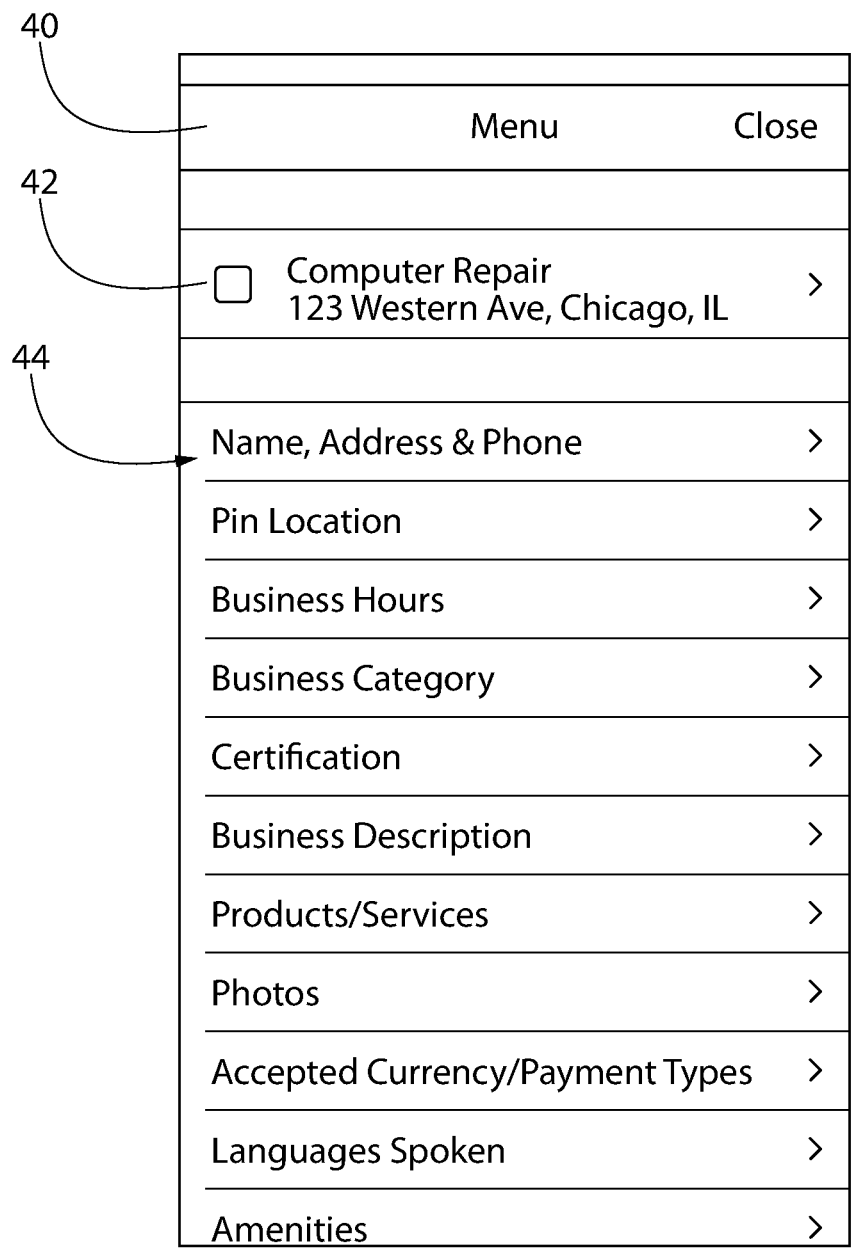
FIG. 6 is a screenshot of the user interface where different categories of organization information can be selected for entry or change for a selected organization location.

FIG. 6 is a screenshot of the user interface 40 where different categories 44 of organization information can be selected for entry or change for a selected organization location. The selected organization location 42 is shown, along with several organization information categories 44. As shown, these categories can include Name, Address & Phone, Pin Location, Business Hours, Business Category, Certification, Business Description, Products/Services, Photos, Accepted Currency/Payment Types, Languages Spoken, and Amenities. The representative can provide information for one or more of these categories. In other embodiments, other categories of organization information can be provided. In the exemplified embodiment, the screenshots and user interfaces discussed below for verification can be accessed by selecting the Certification option, though the invention is not so limited.

Figure 8:
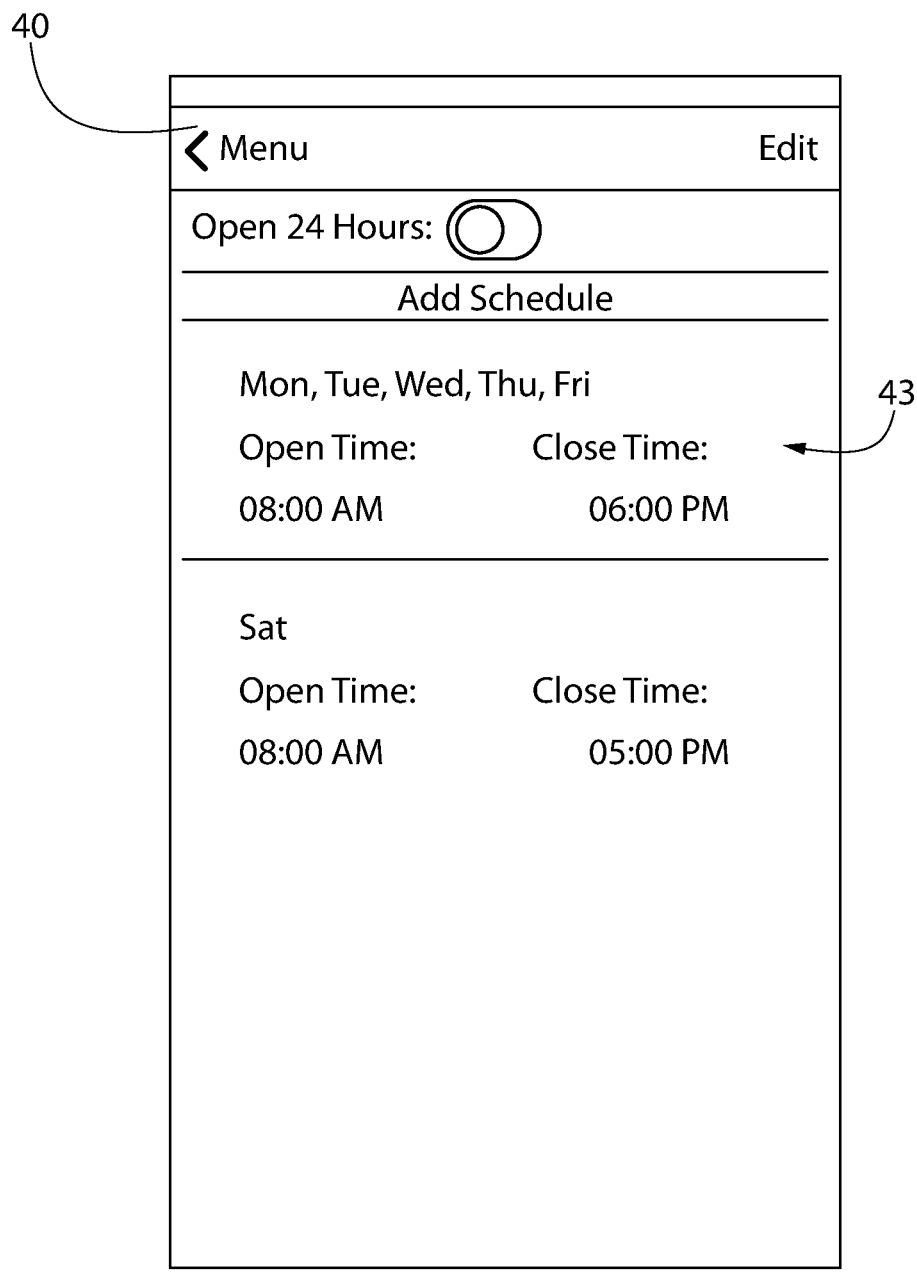
FIG. 8 is a screenshot of the user interface where organization hours can be provided for the selected organization location.

FIG. 7 is a screenshot of the user interface 40 where organization name 45, address 46, and similar information can be provided for the selected organization location. The organization address 46 provided by the representative will be verified by the process described herein. Similarly, FIG. 8 is a screenshot of the user interface 40 where organization hours 43 can be provided for the selected organization location. As can be seen, different hours for different days can be provided. In other embodiments, other organization information can be requested.

Figure 9:
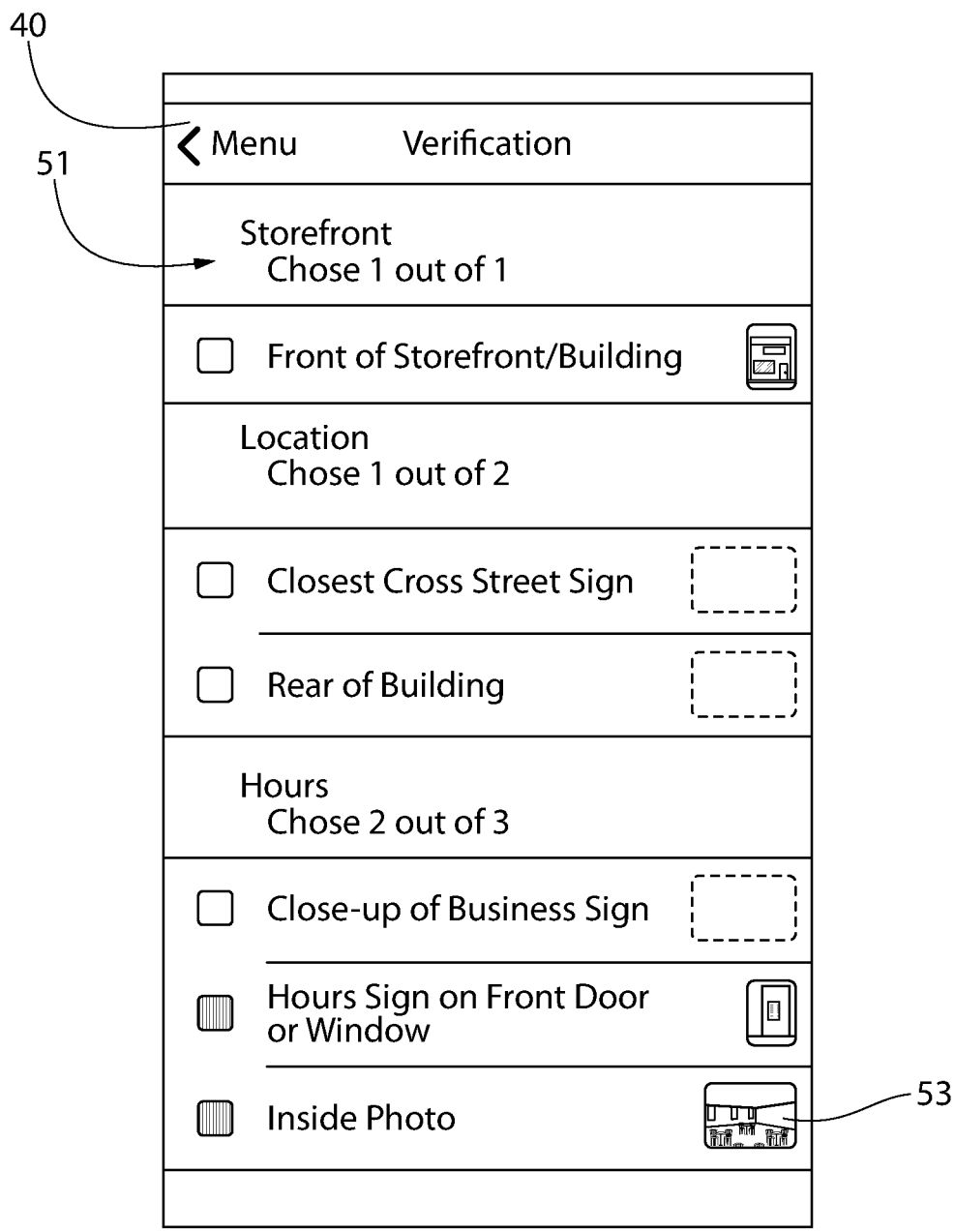
FIG. 9 is a screenshot of the user interface where a representative can provide different categories of photographs for verifying the location of the selected organization.

FIG. 9 is a screenshot of the user interface 40 where a representative can provide different categories of photographs for verifying the location of the selected organization. In discussing FIG. 9, reference is also made to the locations shown in FIG. 2. Different photograph categories 51 are listed in FIG. 9, along with the photograph requirements for each category. For example, for Storefront, a photograph of the front 34 of the organization building 30 is required. Thumbnails 53 of photographs taken are provided. For Location, at least one of two photographs is required: the closest street sign 36 and the rear 35 of the organization building 30. No thumbnail is provided since these photographs have not yet been taken. For Hours, two out of three photographs are required: a close-up of an organization sign 32, an hours sign 37, and an inside 31 of the organization building 30. The hours sign and inside photo have been provided as indicated by the thumbnails 53. In certain embodiments, the number and type of photographs required is based on the type of organization seeking verification. For example, using the user interface 40 shown in FIG. 6, a representative can select Business Category under the organization information categories 44, and then select from various business category options shown by the user interface. A business category such as a grocery store may require few (or no) photographs for verification, while a locksmith may require several photographs.

Figure 10:
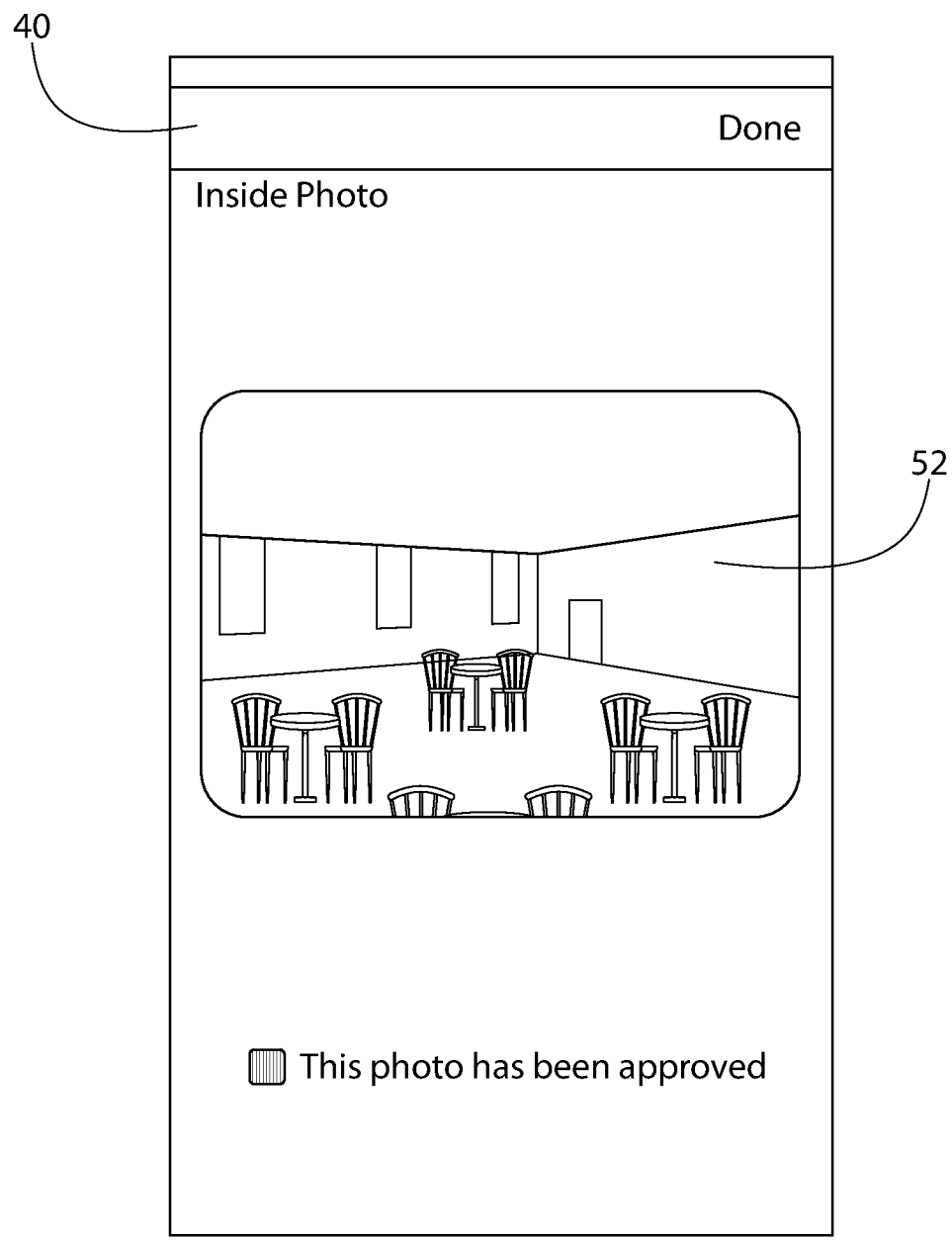
FIG. 10 is a screenshot of the user interface where the photograph of the inside of the selected organization location is shown.

FIG. 10 is a screenshot of the user interface where the photograph 52 of the inside of the selected organization location is shown. This photograph 52 can be displayed, for example, by selecting the thumbnail 53 of the screenshot of FIG. 9. This view can show the representative the quality of the photograph 52, and can also include an indicator as to whether a verifying entity has approved the photograph 52 (for having the correct content). This verification can be carried out, for example, by a person manually reviewing the photographs or by image recognition software. In this example, the photograph 52 would be analyzed to confirm that it shows the inside of the organization building.

Figure 11:
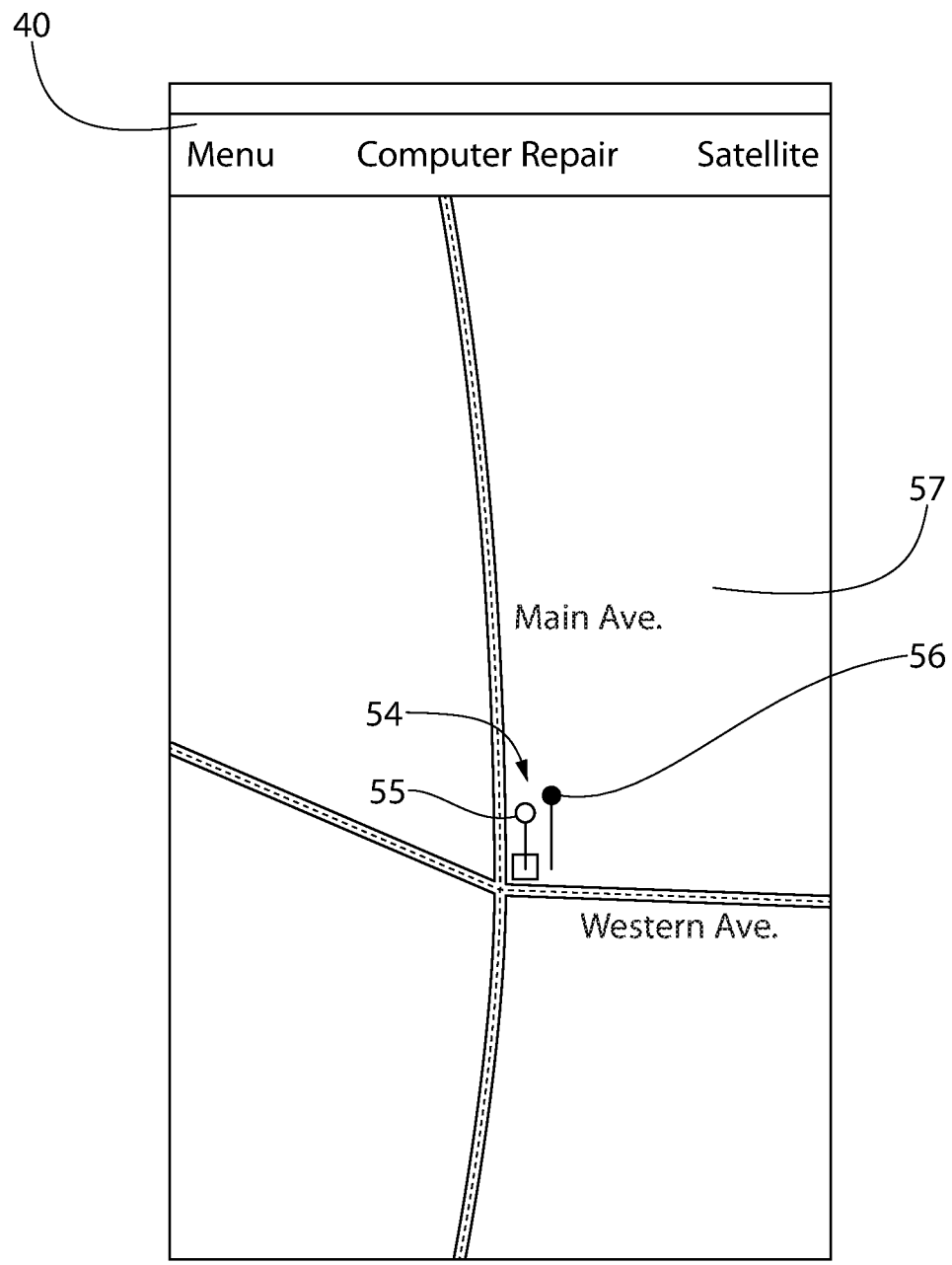
FIG. 11 is a screenshot of the user interface where a map shows a pin location of the selected organization.

FIG. 11 is a screenshot of the user interface 40 where a map 57 shows a pin location 54 of the selected organization. In this embodiment, the user can specify the location of the pin (and geocoordinates) for different locations associated with the organization building by moving the pin on a satellite or street view of the map. In this embodiment, the store entrance location 55 is specified, along with the drive entrance location 56 that is relevant to those arrive at the location by car and are looking to park. In other embodiments, other pins can be provided. In certain embodiments, the representative's ability to insert or move pins on the map can be disabled when, based on data regarding the location of the device, it is determined that the device is not within a certain distance of the area where the pin is being dropped. Further, in certain embodiments, pins can be automatically located based on information associated with the photographs of the organization building and its surrounding area.

Verification Process

Returning to FIG. 3, once the organization representative has provided the organization data using the user interface 40, the server can receive the organization data and provide a verification for the organization address provided. (operation 27). In one embodiment of a method of verifying a location of an organization, the required organization data includes organization name data indicative of an organization name, organization address data indicative of a location of the organization, photograph files for photographs of specific different portions of the location of the organization, and photograph location data indicative of where each of the photographs was taken. In the exemplified embodiment, the organization address data is an address, though other data (such as geocoordinates) can be organization address data. A photograph file can be any file for storing data for a photograph. The different portions of the location can be any parts, sections, perspectives, or aspects of a location, including any of the portions discussed above in reference to FIG. 2, namely, a photograph of an inside portion 31 of an organization building 30 at the organization location, a photograph of an organization sign 32 having the organization name, a photograph of an organization storefront 34, a photograph of a rear 35 of an organization building, a photograph of a cross street sign 36 closest to the organization location, and a photograph of an indicator 37 of organization operating hours.

Photograph Location Data

The photograph location data can be any data indicative of where a photograph was taken. In the exemplified embodiment, the device is a mobile device having a camera for taking photographs, and the photograph location data comprises Exif data for each photograph file of each photograph, Exif data having standard tags for GPS location information. Geotagging can be utilized. Geotagging is a process by which geographical identification metadata can be added to media such as photographs. This data usually consists of latitude and longitude coordinates, though they can also include data for features such as altitude, bearing, and distance. The geotag information is embedded in the metadata of the photograph file, stored in Exchangeable image file format (Exif). Latitude and longitude are typically stored in units of degrees with decimals. Thus, the photograph location data can form part of the photograph files. In the exemplified embodiment, the photograph location data comprises geocoordinates.

In the exemplified embodiment, the photograph location data further comprises device location data generated by the mobile device at the time each photograph was taken, the device location data being separate and distinct from the photograph files (including the files' Exif data). This device location data for each photograph is received, at the server, immediately after the photograph is taken (or upon the photograph being taken). Thus, when a photograph is taken, the device sends device location data (e.g., a geolocation) that is separate from the photograph files and Exif data to the server. This device location data can serve to confirm that the representative did not alter the Exif data of the photograph file before sending the photograph file to the server.

The invention is not so limited. In other embodiments, different photograph location data can be used, such as only the Exif data (or only other data from the photograph files), or only the device location data that is separate from the photograph files. Further, other file data separate or different from Exif data can be used for the photograph location data, such as data stored in Extensible Metadata Platform (XMP) format. Further, the photograph location data need not be GPS data or geocoordinates. Further, the device need not be a mobile device. For example, the device can be a desktop computer providing photograph files uploaded from a digital camera. Further, if device location data is used, it need not be sent immediately after the photograph is taken.

Address Confidence Level

Verification can include determining a confidence level for the organization location address based on the organization address data and the photograph location data. In the exemplified embodiment, the organization data is used to determine a confidence level that indicates how confident the system is that the address data provided by the organization representative is accurate. This confidence level can be represented by any scale or level of measurement, such as a 1 to 10 scale, a grading scale (A to F), a percentage (0% to 100%), an ordinal scale having a spectrum of values (e.g., Very Confident, Confident, Somewhat Confident, Not Confident), or simply a dichotomous scale (e.g., verified or non-verified). In the exemplified embodiment, confidence level is indicated on a scale of 1 to 10 with 10 being the most confident and 1 being the least confident. If the confidence level falls below a certain level, a human reviewer can be alerted, for example, by placing a red flag next to the organization information on the user interface or highlighting a portion of the organization information on the user interface.

The verification and/or confidence level for the organization location is based on the photograph location data and the organization address data. A comparison of this data helps enable the system to confirm that the photographs provided were actually taken at the organization address indicated, and thus that the organization address is a reliable location. In one embodiment, the server determines an address geolocation based on the organization address data, and determines photograph geolocations based on the photograph location data for each of the photographs. The verification and/or confidence level can be based on a distance between the photograph geolocations and the address geolocation. For example, the closer the distance between the address geolocation and the photograph geolocations, the higher the confidence level, and the more likely the location will be verified. A confidence level can be presented to a human reviewer in several manners, including in a manner similar to the best geolocation confidence level 68 shown in FIG. 12 (discussed below).

The invention is not limited to the above methods of determining verification and/or confidence level. Instead of distance, the server can base verification and/or confidence level on whether the geolocations are both within a predefined area. Alternatively, the geolocations can be compared manually by a person reviewing the organization data provided. For example, the person can review a map showing the different geolocations to determine a confidence level in the address provided by the representative. Further, the confidence level can be based on additional data, such organization location data available on the internet. For example, a web crawler can systematically browse the internet for information on an organization and provide addresses and/or geolocations associated with the organization for comparison. The server can compare multiple geocoordinates for a location. The verification and/or confidence level can be based on how close the coordinates are to each other.

The verification and/or confidence level can be based on an algorithm run by the server that automatically updates the confidence level when new data is received. Further, in addition to providing a confidence level for a location, a confidence level can be provided for a user (i.e., a representative). If the user consistently provides accurate information to the system, the user will earn a high confidence level score. This user confidence level score can then be used as a basis for the confidence level for a given location. A high enough confidence level score for a user can be used as a basis for bypassing the certification requirements described above.

As indicated above, the exemplified method can further include verifying that the photograph content is correct, and thus that the photographs show the specific different portions of the location so indicated. This verification can be carried out, for example, by a person manually reviewing the photographs or by image recognition software. In one embodiment, if the photograph content is verified and the photograph location data corresponds with the organization address data, the organization location can be considered verified and/or given a high confidence level. It is noted that, among other things, the reviewer can verify that the names shown in the address sign is consistent with the organization name input by the representative (such as the Place Name provided in FIG. 7).

Since the verification method described herein is particularly useful to third party search engines, the method can further comprise providing a third party an application programming interface (API) for providing access to data regarding the verification and/or confidence level for the organization location. The API can also be used for providing other data to other third parties.

The system described herein can also provide different access levels (and editing capabilities) to different organization representatives. For example, while one representative may have the capabilities described above, another cannot edit the organization name data, but can edit organization data related to hours open. Any combination of capabilities can be allowed. Subscriptions for user access can be added and managed through a website (including the addition of user-managed locations). Subscriptions information can include typical user-identification information, along with one or more authorized devices (typically a smart phone).

Best Geolocation

The method described herein can further include determining a best geolocation for an organization. The best geolocation can be based on the photograph location data. The best geolocation may also be based on data obtained on the internet, and/or an analysis of satellite maps of the area and other maps and images. The best geolocation can further be based on geolocations provided by the client, such as those provided as in FIG. 11. In one embodiment, the system determines best geolocations for an entrance (where a person would typically enter the organization building), a route location (where the public road meets the private road entrance for visitors driving a vehicle to the organization building), and a roof top location (which can, in one embodiment, be located approximately above where the cash register in the organization building would be), though the invention is not so limited.

Figure 12:
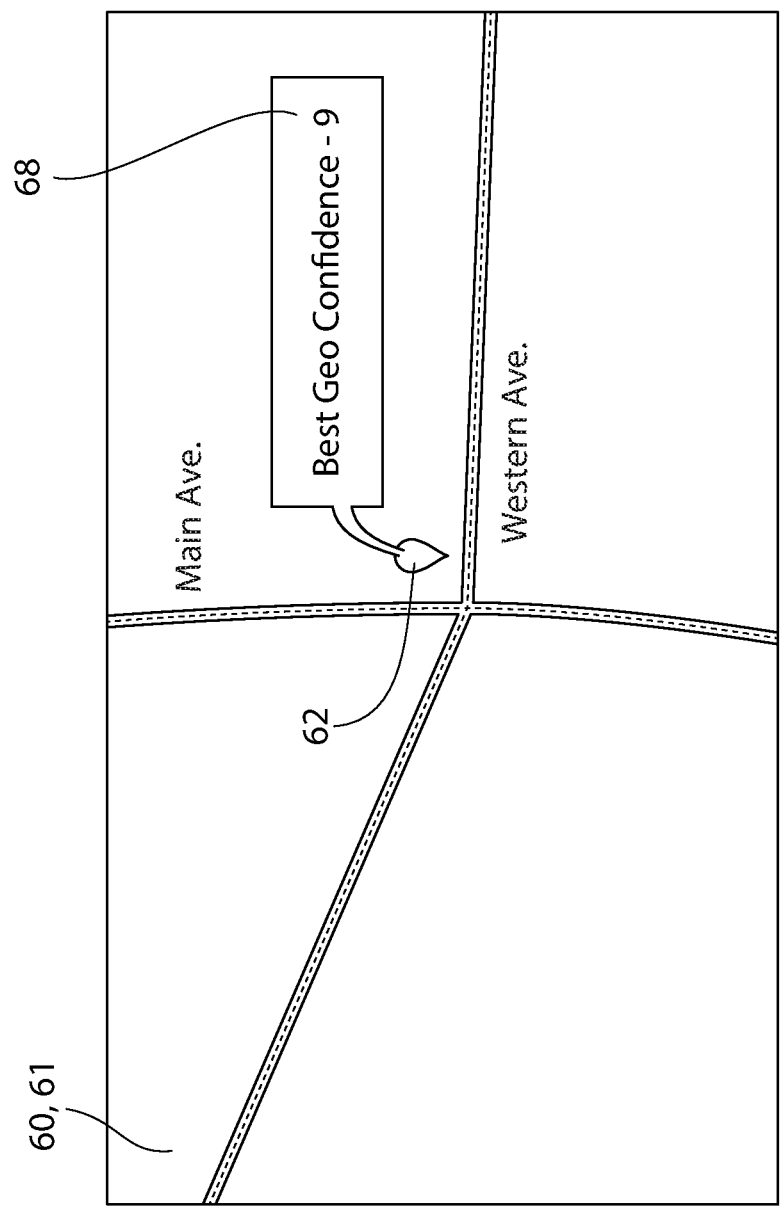
FIG. 12 is a screenshot of a reviewer user interface 60 for displaying a best geolocation and a confidence level according to one embodiment.

Further, the determined best geolocation can be given a confidence level. Such a confidence level can be determined by referencing the distances between the photograph geolocations and the best geolocation. FIG. 12 is a screenshot of a reviewer user interface 60 for displaying a best geolocation 62 and a best geolocation confidence level 68 according to one embodiment. In this embodiment, the best geolocation 62 is shown on map 61 of the relevant area for the organization location. As with the address confidence level for the address provided by the representative (discussed above), the confidence level can be represented by any scale or level of measurement. In the exemplified embodiment, confidence level is indicated on a scale of 1 to 10 with 10 being the most confident and 1 being the least confident. The best geolocation 62 in FIG. 12 is given a high confidence level 68, shown as a 9 out of 10. This user interface 60 can also show the specific geocoordinates for the best geolocation 62.

The best geolocation confidence level 68 can be automatically generated using an algorithm that considers various factors, such as the distance between the best geolocation, the photograph location data, the organization address data provided by the representative, locations from the internet, any other locations associated with the location, any other factors discussed above with reference to the address confidence level, and any combination thereof. In other embodiments, this confidence level can be assigned by a human reviewer that views such locations and determines a level of confidence.

Parallel Transactions Using Multiple Tokens

One problem that can be encountered in the above process is that the smartphone or other device being used to provide geolocation data may be in a condition such that it is difficult or otherwise not ideal to transmit and/or receive data, particularly, large amounts of data. For example, if a user's phone is not connected to Wi-Fi, the transmission of photographs can cause a user to consume large amounts of data from the user's data plan. Further, a weak cellular signal can cause the upload of photos to take an excessively long time, or simply not be possible.

To address this issue, in one embodiment, the process can utilize a background process that runs even when the foreground process is not active, thus preventing the need for repeated logins to complete pending business processes. This is accomplished by allowing for multiple valid tokens in a session, rather than one token per device per transaction as is currently done.

Figure 13:
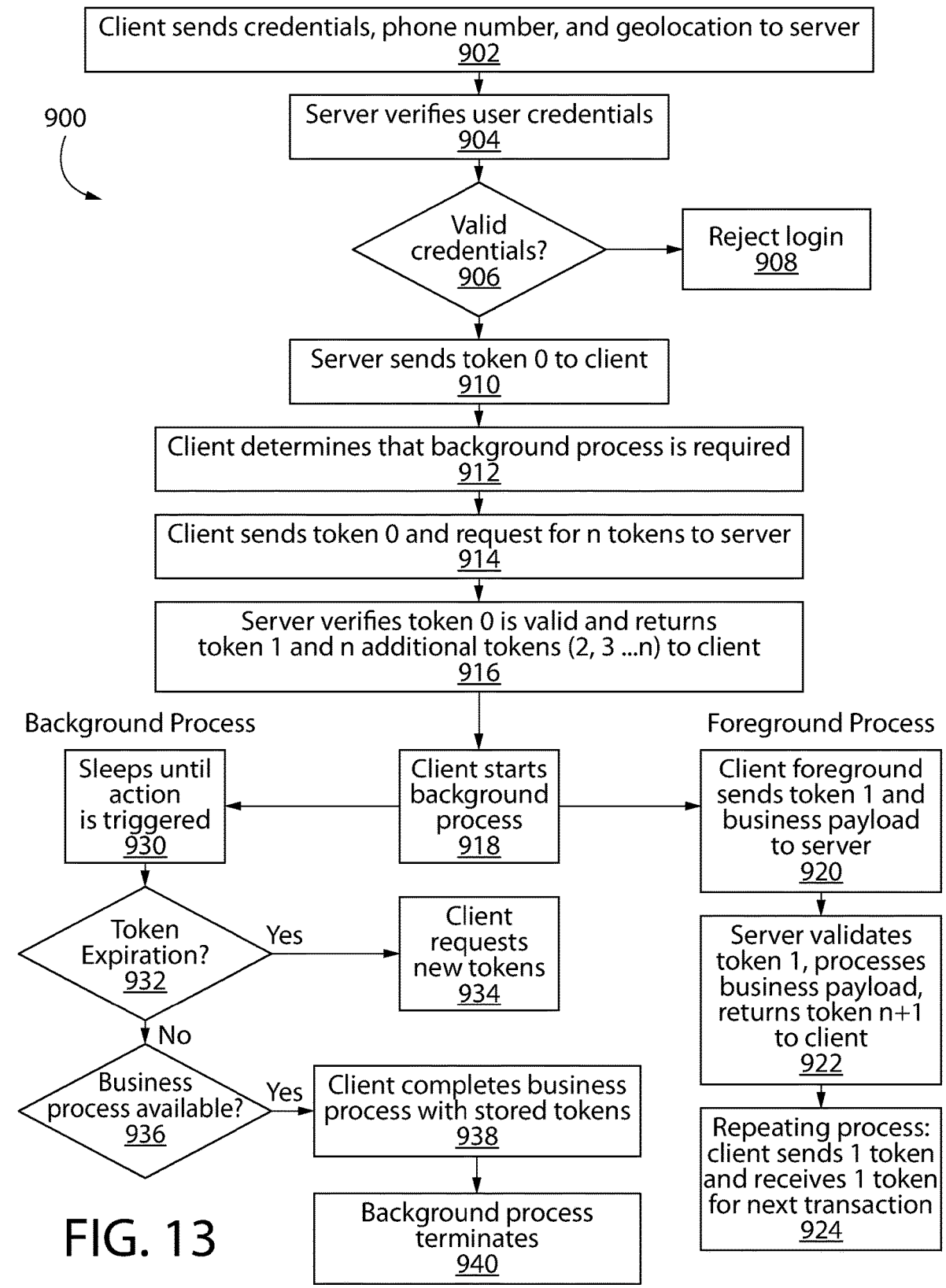
FIG. 13 is a flow chart of method of enabling parallel transactions using multiple tokens according to one embodiment.

This process can be understood with reference to FIG. 13, which is a flow chart of method of enabling parallel transactions using multiple tokens according to one embodiment. In a first step (operation 902), the client (e.g., user's mobile phone) sends login credentials to the server, along with the client's phone number and current geolocation. The server then verifies the user credentials (operation 904), rejecting the login if the credentials are not valid.

The validity of the credentials is determined (operation 906). If not, the login is rejected (operation 908). If the credentials are valid, the server sends a first token ("token 0") to the client (operation 910). As used herein, a "token" can be understood as an arbitrary string of letters, numbers, special characters, and/or other identifiers that uniquely identifies a validated client device. A token can be created with a one-way hash. In the exemplified embodiment, each token can be used only once and expires after a predetermined period of time.

Next, the client determines whether a background process is required (operation 912). This can be based on the client (e.g., phone) having a compromised ability to transmit and receive information, for example, due to the phone not having a wireless connection, or to a weak cellular signal.

Next, the client, in order to complete a business process (e.g., uploading photos), sends the first token (token 0) to the server and requests n number of tokens (operation 914), where the n number of tokens is based on the business process to be completed. For example, if the client phone was attempting to upload 5 photographs, the phone can request 5 tokens.

The server then verifies the first token (token 0) and sends to the client the newly requested tokens (e.g., token 1, token 2, token 3, token 4, and token 5) (operation 916).

Next, the background process begins (operation 918), which enables the session to remain open, even when the foreground process is not running. The background process sleeps until action is triggered (operation 930). When action is triggered (e.g., a predetermined time period elapses), it is determined whether the requested tokens (e.g., tokens 1-5) have expired (operation 932). If so, the system automatically requests new tokens (operation 934). If not, it is determined whether a business process is available (operation 936), that is, whether the conditions are now proper to complete the postponed business process (e.g., whether the phone is now on Wi-Fi to upload the 5 photos). If it is, the client completes the business process using the stored tokens (e.g., uploads the 5 photos) (operation 938), and then terminates the background process (operation 940).

By sending tokens upon expiration of the originally requested tokens, the session can be maintained even when the foreground process is not active, thus preventing repeated logins to complete pending business processes.

At the same time as the background process (or separately), the foreground process can operate. In the example being used, the foreground process can carry out lower-data processes while the client has compromised connectivity. To complete a business process using the foreground process, the client sends to the server a token and a business payload (an indication of the data needed from the server to complete the process) (operation 920). The server validates the token, processes the business payload, and returns a new token (operation 922). This process is repeated for each new transaction (operation 924).

It is noted that a similar process can be used for simultaneous foreground transactions, such as multiple uploads at once. The main difference for carrying out simultaneous transactions is that there is no determination that the background process is required, and the background process is not utilized.

While the inventions have been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the invention should be construed broadly as set forth in the appended claims.

What is claimed is:

1. A method of verifying a location of an organization, the method comprising:
    (a) providing, by a server, a user interface to a mobile device of a representative of an organization, the user interface prompting the representative to provide organization data, the organization data comprising:
        organization name data indicative of an organization name;
        organization address data indicative of a location of the organization;
        photograph files comprising photographs taken by the mobile device of specifically-indicated different portions of the location of the organization, the photographs comprising at least two of:
            a photograph of an inside portion of an organization building at the organization location;
            a photograph of an organization sign having the organization name;
            a photograph of an organization storefront;
            a photograph of a rear of an organization building;
            a photograph of a cross street sign closest to the organization location; and
            a photograph of an indicator of organization operating hours;
    (b) for each of the photographs taken by the mobile device, upon the photograph being taken, the mobile device automatically generating, at the time the photograph was taken, device location data indicative of a location of the mobile device at the time the photograph was taken, the device location data forming part of the organization data;
    (c) the mobile device storing the device location data separately from the photograph files;
    (d) the mobile device transmitting the organization data to the server, wherein for each of the photographs, the corresponding device location data is sent to the server immediately after the photograph is taken or upon the photograph being taken;
    (e) verifying, by the server, that the organization address data corresponds with the device location data for the photographs;
    (f) verifying that each of the photographs has visual content corresponding with the photograph's specifically-indicated portion of the location; and
    (g) upon completing steps (e) and (f), the server providing data to a third party indicating the location of the organization has been verified.

2. The method of claim 1 wherein the photographs of specifically-indicated different portions of the location of the organization comprise at least three of:
    a photograph of an inside portion of an organization building at the organization location;
    a photograph of an organization sign having the organization name;
    a photograph of an organization storefront;
    a photograph of a rear of an organization building;
    a photograph of a cross street sign closest to the organization location; and
    a photograph of an indicator of organization operating hours.

3. The method of claim 1 wherein the organization data further comprises data from the photograph files.

4. The method of claim 3 wherein the organization data comprises Exif data for each photograph file of each photograph.

5. The method of claim 1 wherein the organization data comprises geocoordinates indicative of where each of the photographs was taken.

6. The method of claim 1 further comprising providing, by the server, a confidence level for the organization location based on the organization address data and the device location data.

7. The method of claim 6 further comprising:
    determining an address geolocation based on the organization address data; and
    determining photograph geolocations based on the device location data for each of the photographs;

wherein the confidence level is based on distances between the photograph geolocations and the address geolocation.

8. The method of claim 1 further comprising providing the third party an application programming interface (API) for providing access to data regarding the confidence level for the organization location.

9. The method of claim 1 further comprising determining a best geolocation for the organization location based on the device location data.

10. The method of claim 9 wherein:
photograph geolocations are determined based on the device location data for each of the photographs;
the best geolocation is given a confidence level based on distances between the photograph geolocations and the best geolocation.

11. A system comprising:
a mobile device of a representative of an organization, the mobile device having a camera for taking photographs;
a server configured to provide a user interface to the mobile device, the user interface prompting the representative to provide organization data, the organization data comprising:
organization name data indicative of an organization name;
organization address data indicative of a location of the organization;
photograph files comprising photographs taken by the mobile device of specifically-indicated different portions of the location of the organization, the photographs comprising at least two of:
a photograph of an inside portion of an organization building at the organization location;
a photograph of an organization sign having the organization name;
a photograph of an organization storefront;
a photograph of a rear of an organization building;
a photograph of a cross street sign closest to the organization location; and
a photograph of an indicator of organization operating hours;
wherein the mobile device is configured to:
take the photographs;
for each of the photographs, upon the photograph being taken, automatically generate, at the time the photograph was taken, device location data indicative of a location of the mobile device at the time the photograph was taken, the device location data forming part of the organization data;
store the device location data separately from the photograph files; and
transmit the organization data to the server, wherein for each of the photographs, the corresponding device location data is sent to the server immediately after the photograph is taken or upon the photograph being taken wherein the server is further configured to:
receive the organization data from the mobile device;
verify that the organization address data corresponds with the device location data for the photographs;
verify that each of the photographs has visual content corresponding with the photograph's specifically-indicated portion of the location; and
upon completing the verifications of the organization address data and the visual content of the photographs, provide data to a third party indicating the location of the organization has been verified.

12. The system of claim 11 wherein the photographs of specifically-indicated different portions of the location of the organization comprise at least three of:
a photograph of an inside portion of an organization building at the organization location;
a photograph of an organization sign having the organization name;
a photograph of an organization storefront;
a photograph of a rear of an organization building;
a photograph of a cross street sign closest to the organization location; and
a photograph of an indicator of organization operating hours.

13. The system of claim 11 wherein the organization data further comprises Exif data for each photograph file of each photograph.

14. A non-transitory computer-readable storage medium encoded with instructions which, when executed on a processor, perform a method of:
(a) providing, by a server, a user interface to a mobile device of a representative of an organization, the user interface prompting the representative to provide organization data, the organization data comprising:
organization name data indicative of an organization name;
organization address data indicative of a location of the organization;
photograph files comprising photographs taken by the mobile device of specifically-indicated different portions of the location of the organization, the photographs comprising at least two of:
a photograph of an inside portion of an organization building at the organization location;
a photograph of an organization sign having the organization name;
a photograph of an organization storefront;
a photograph of a rear of an organization building;
a photograph of a cross street sign closest to the organization location; and
a photograph of an indicator of organization operating hours;
(b) for each of the photographs taken by the mobile device, upon the photograph being taken, the mobile device automatically generating, at the time the photograph was taken, device location data indicative of a location of the mobile device at the time the photograph was taken, the device location data forming part of the organization data;
(c) the mobile device storing the device location data separately from the photograph files;
(d) the mobile device transmitting the organization data to the server, wherein for each of the photographs, the corresponding device location data is sent to the server immediately after the photograph is taken or upon the photograph being taken;
(e) verifying, by the server, that the organization address data corresponds with the device location data for the photographs;
(f) verifying that each of the photographs has visual content corresponding with the photograph's specifically-indicated portion of the location; and
(g) upon completing steps (e) and (f), the server providing data to a third party indicating the location of the organization has been verified.

* * * * *